United States Patent [19]
Eberly, Jr. et al.

[11] 3,778,598
[45] Dec. 11, 1973

[54] DOCUMENT AUTHENTICATION METHOD AND APPARATUS

[75] Inventors: David H. Eberly, Jr., Fairfield, Conn.; Peter E. Hanke, White Plains, N.Y.

[73] Assignee: United States Banknote Corporation, New York, N.Y.

[22] Filed: Feb. 3, 1972

[21] Appl. No.: 223,079

[52] U.S. Cl... 235/61.11 D, 324/34 TK, 340/149 A, 235/61.12 M, 179/100.2 A

[51] Int. Cl... G06k 7/08, G01r 33/12, G06k 19/06, G11b 5/70

[58] Field of Search ..... 324/34 TK; 340/149 R, 149 A, 174 TF, 174 QA; 235/61.11 D, 61.11 R, 61.11 H, 61.11 K, 61.12 M, 61.11 M; 179/100.2 A

[56] References Cited

UNITED STATES PATENTS

| | | | |
|---|---|---|---|
| 3,509,535 | 4/1970 | Berube | 340/149 A |
| 3,599,153 | 8/1971 | Lewis | 340/149 A |
| 3,463,907 | 8/1969 | Lewis | 235/61.11 D |
| 3,160,867 | 12/1964 | Fitzgerald | 340/149 R |
| 3,440,527 | 4/1969 | Steingroever | 324/34 TK |
| 3,345,559 | 10/1967 | Takahashi | 324/34 TK |

*Primary Examiner*—Maynard R. Wilbur
*Assistant Examiner*—Robert M. Kilgore
*Attorney*—John W. Malley et al.

[57] ABSTRACT

A method and apparatus for authenticating a document having intaglio printing such as a stock certificate, currency or security stamp, whereby a magnetic head is passed over successive lines of magnetic ink on the document so as to produce successive electrical pulses. These pulses are amplified, half-wave rectified and applied to an integrating circuit so that the output of the integrating circuit increases as successive lines are passed. The integrated signal is then applied to an operational amplifier together with a constant voltage whose amplitude can be manually adjusted by a potentiometer. The output of the operational amplifier is applied to a transistor so that, when the potentiometer is properly adjusted, the transistor shifts to its non-conductive state when the last of the lines is encountered by the head. A flip flop is connected to the transistor so that it changes state to cause a bulb to light, indicating authentication, when the transistor becomes non-conductive, or a solenoid to operate to divert counterfeit documents or products.

6 Claims, 7 Drawing Figures

PATENTED DEC 11 1973 3,778,598

DOCUMENT AUTHENTICATION METHOD AND APPARATUS

BRIEF DESCRIPTION OF THE PRIOR ART AND SUMMARY OF THE INVENTION

A method and apparatus for authenticating a document having intaglio printing.

Quality documents, such as currency, stock certificates, and the like, are now printed by an intaglio process in which ink is applied to the surface of a printing cylinder or the like which has grooves and points etched into its surface in which the ink collects. When applied to a sheet of paper or the like, the ink forms raised points in mounds on the paper which each vary in height, and hence darkness, with the depth of the associated point or groove on the etched plate surface. Since documents of this type are widely counterfeited, the need for a simple, reliable and inexpensive way to authenticate intaglio printed documents, such as currency and stock certificates, is apparent.

U.S. Pat. No. 3,599,153 describes one such authentication approach in which a portion of the intaglio printing is done with magnetic ink. For readout, the ink is saturated by a magnetic field and then passed beneath a magnetic reading head which produces an electrical signal which varies in amplitude with the height of the magnetic ink which the head passes. This signal can then be compared with a standard signal to authenticate or reject the document.

This approach is capable of detecting counterfeited documents which are intaglio printed but which do not have exactly the correct amount of magnetic ink at exactly the correct locations. However, this capability is seldom really needed since almost all counterfeited documents are not intaglio printed so that a simple detection of whether or not the document is intaglio printed will catch these. Further, since the counterfeiter can be expected to have greater difficulty in obtaining and printing proper magnetic ink so that the reading head will produce a signal over a given amplitude, simply detecting the presence of magnetic ink in volumes large enough to be extremely hard for the counterfeiter to produce will catch almost all counterfeited documents. The sophisticated, complex and relatively expensive capabilities of the device described in the above application are thus largely unnecessary.

A copending application, Ser. No. 223,214 entitled "Security Label" by David H. Eberly and Kenneth Smith, filed on the same date as this application, described a label which can be attached to products such as phonograph records, tapes and cartridges for authentication. This application discloses a label having an upper surface with a plurality of parallel, separated bars of intaglio ink printed thereon, preferably in magnetic ink. The opposite label side preferably includes adhesive for attaching the label to a product such as a record album cover.

The present invention relates to an apparatus and method whereby the production of one or more electrical signals having an amplitude greater than a given value as a head passes over magnetic ink on an intaglio printed document or label with parallel intaglio bars causes an indication that the document is authentic to be given. In the particular embodiment of the invention set forth below, a conventional magnetic head passes over one or more masses of magnetic ink on the document to be authenticated so that each such passage causes the head to produce an electrical signal.

Each such signal is applied to one input of an operational amplifier having a positive and negative input with both inputs normally connected to the same voltage source. The output of this amplifier is passed via a half-wave rectifying diode to an integrating circuit so that the output of the circuit increases with successive signals which result from passage over successive magnetic ink masses. The output of the integrating circuit is in turn connected as one input to an operational amplifier which has as its other input a constant voltage which can be varied manually by means of a potentiometer. The output of this amplifier is connected to a transistor which shifts from its conductive to its non-conductive state when the output of the integrating circuit reaches a predetermined value which can be adjusted with the potentiometer. In one embodiment, the shifting of the transistor to its non-conductive state triggers a bistable multivibrator or flip flop which in turn causes a bulb to light and remain lit, indicating the document is authentic, until the flip flop is manually reset. In another embodiment a solenoid is triggered to cause diversion of a document or product found to be counterfeit.

Many other objects and purposes of the invention will become clear from the following detailed description of the invention.

DETAILED DESCRIPTION OF THE DRAWINGS

Figure 1:
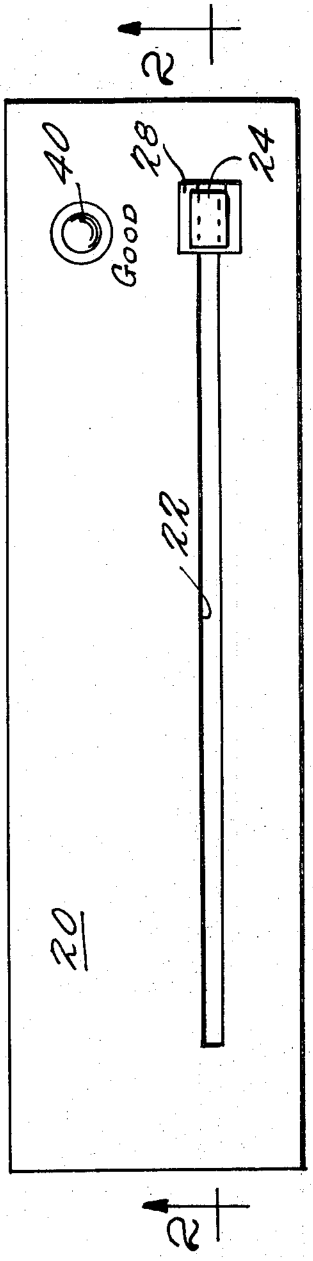
FIG. 1 shows a top view of one embodiment of the invention.
Figure 2:
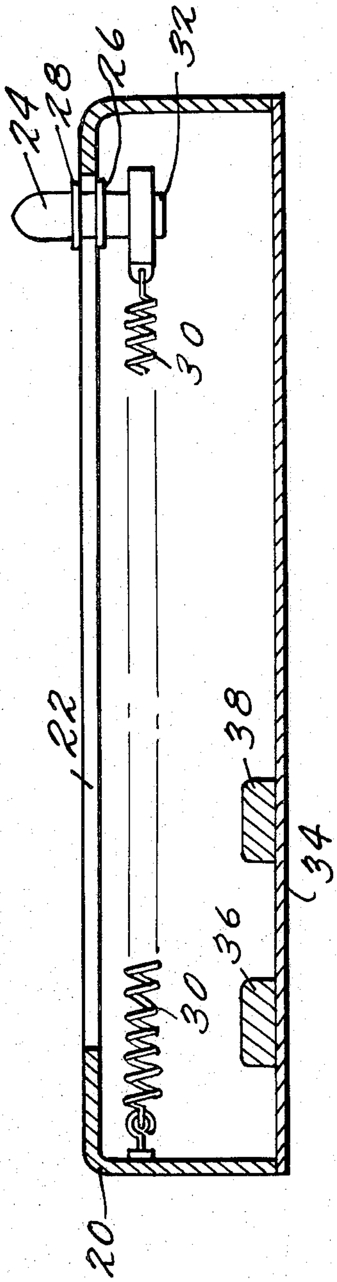
FIG. 2 shows a cut-away view of the embodiment of FIG. 1 along the line 2—2.

Reference is now made to FIGS. 1 and 2 which illustrate one embodiment of the invention. In this embodiment, a housing 20, which may be of any suitable material such as metal, plastic, etc., has a slot 22 on its upper surface along which a member 24 can move. Member 24 is constrained against vertical movement by abutments 26 and 28 and extends above slot 22 as shown. Further, member 24 is connected to housing 20 by a conventional spring 30 so that, when member 24 is manually pulled from one end of slot 22 to the position shown at the other end and released, the force exerted by spring 30 causes member 24 to move along the slot back to its initial position. Housing 20 preferably contains batteries for powering the detecting circuit and is completely portable.

Figures 4, 5:
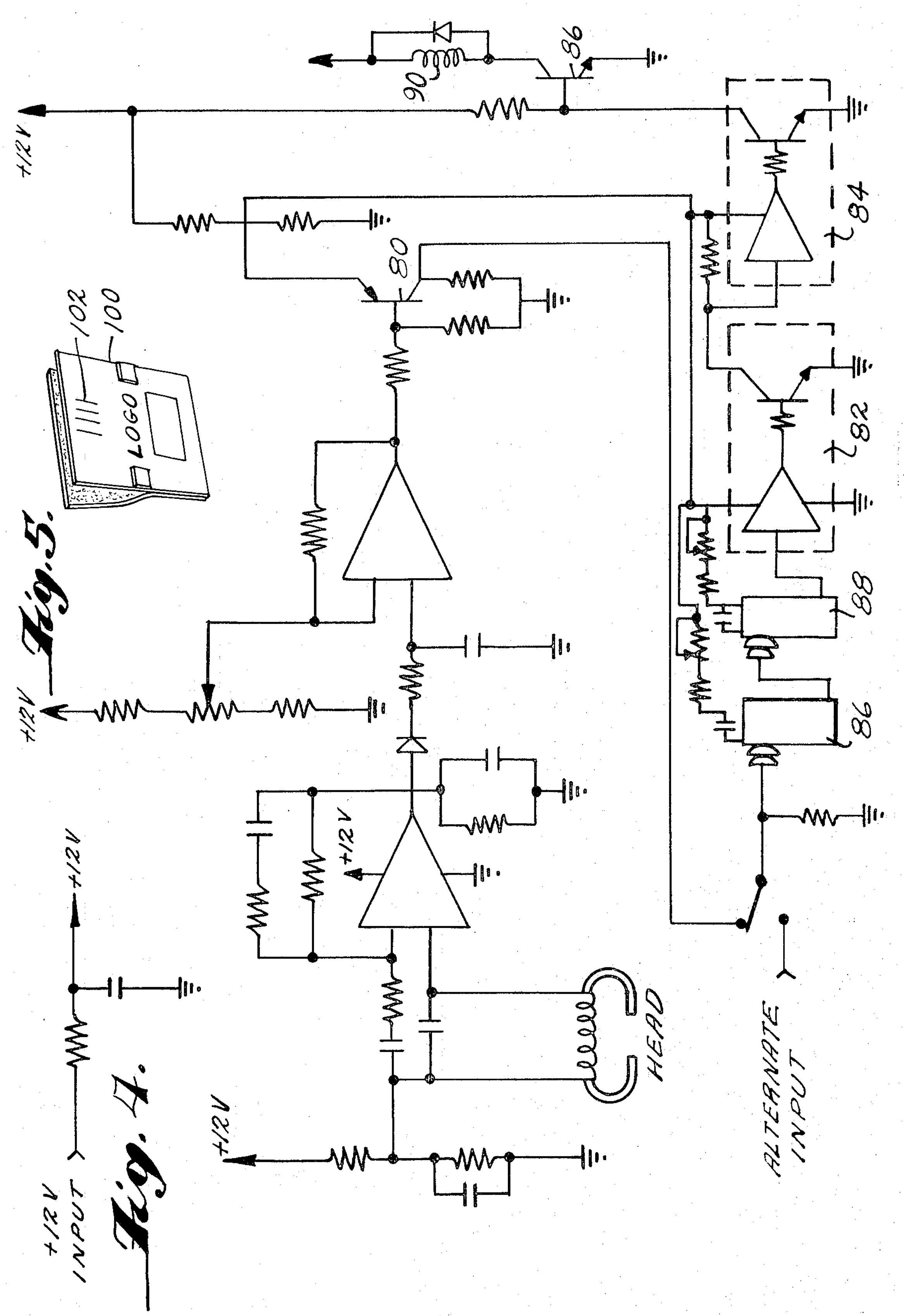
FIG. 4 shows a schematic view of a further embodiment of the circuitry.
FIG. 5 shows a perspective view of a security stamp.

A conventional magnetic head 32 is mounted on member 24 as shown in FIG. 2 so that as member 24 is pulled along slot 22 by spring 30, head 32 passes adjacent masses of ink which have been intaglio printed onto paper 34 or past a label such as shown in FIG. 5. At least some of these masses include magnetic material which is either magnetized permanently or has just previously been magnetized by production of a magnetic field in the space about the document. These magnetic masses which are preferably bars of magnetic ink are so positioned on paper 34 and slot 22 is located on housing 20 so that head 32 passes directly over the magnetic ink masses, producing a voltage spike as it passes over each such mass. Two masses 36 and 38 are shown in FIG. 2 and it will be understood that their size is exaggerated for purposes of illustration. Preferably, the magnetic masses are a plurality, such as five, of relatively straight lines of ink disposed so that the head moves over each along a direction substantially transverse to the line along which the ink in that line extends. A bulb 40 is also provided for housing 20 for indicating whether the document is authentic.

Figure 3:
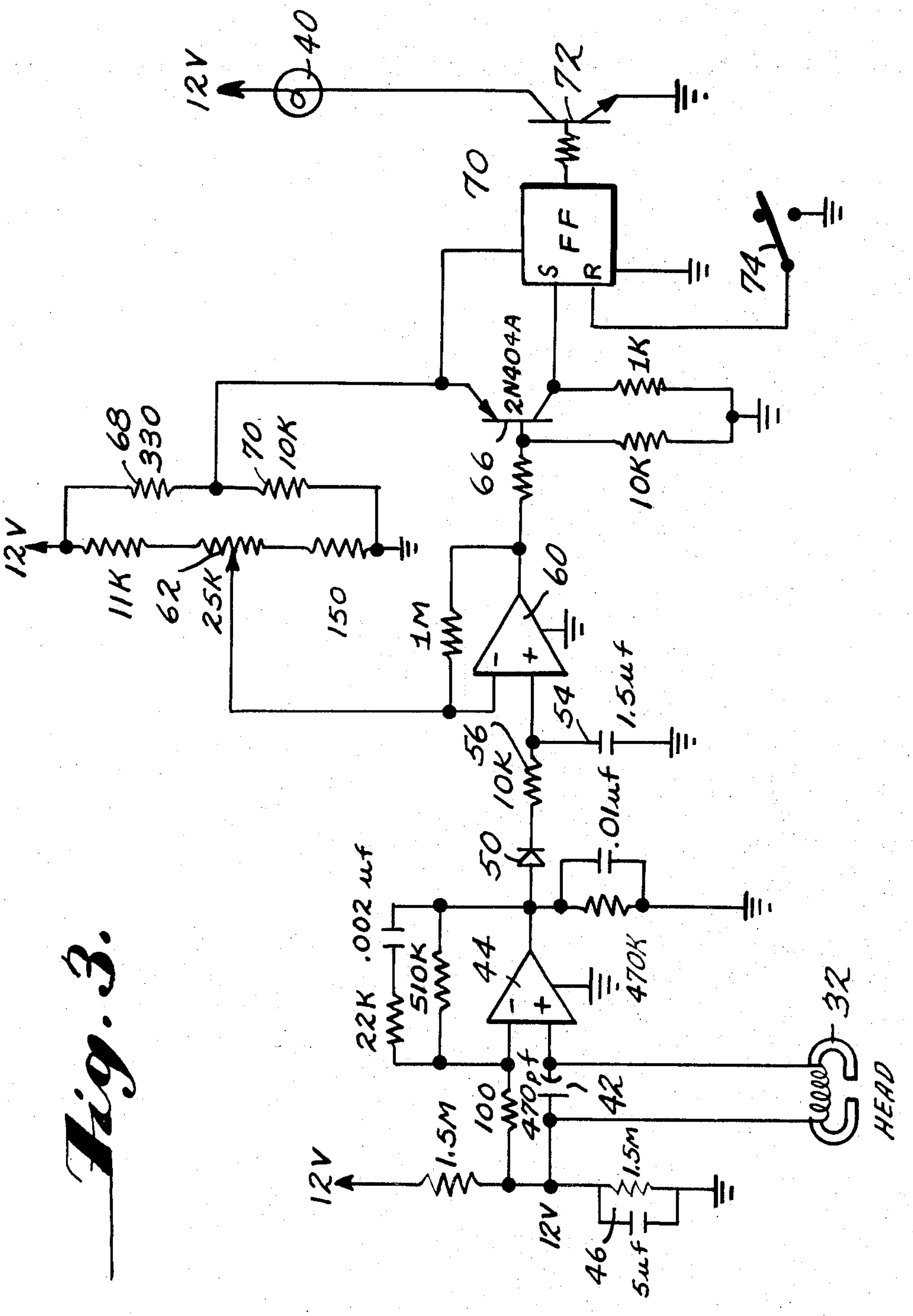
FIG. 3 shows a schematic view of the circuitry for determining whether the document being checked is authentic.

Reference is now made to FIG. 3 which shows a schematic view of the circuit which employs the electrical signals produced by head 32 to produce an indication of the authenticity of the document being checked. In FIG. 3, suitable values for the passive electrical elements are shown and it is, of course, understood that other values and elements can be employed. Head 32 is connected across capacitor 42 so that the electrical signal which results from the passage of head 32 adjacent a mass of magnetic ink is applied to the positive input of a conventional operational amplifier 44.

Before such a signal is produced, both inputs to amplifier 44 are at the same potential, namely the potential to which capacitor 46 has charged. Since the amplitude of the output of amplifier 44 is a function of the difference in amplitude between the positive and negative inputs, the output of amplifier 44 has no amplitude when both inputs have the same amplitude. However, head 32 is connected to capacitor 42 so that the leading positive peak electrical signal produced by head 32 first raises the amplitude of the positive input so that a signal having a positive amplitude is produced at the output of amplifier 44. The output is also amplified according to the values of the input and feedback elements.

The output of amplifier 44 is connected via diode 50 to an integrating circuit comprised of capacitor 54 and resistor 56. Diode 50 serves to block the negative output signals from amplifier 44 which follow the positive output signals as the trailing negative peak of the signals produced by head 32 causes the output of amplifier 44 to become negative. The voltage across capacitor 54, which is connected to the positive input of operational amplifier 60, then builds as successive positive pulses are applied to it via diode 50 in response to the passage of head 32 over successive masses of magnetic material. The negative input to amplifier 60 is connected to a constant voltage source via potentiometer 62 which can be manually adjusted to vary the voltage applied to the negative input to amplifier 60.

The output of amplifier 60 is a function of the difference in amplitude between the positive and negative inputs, amplified in accordance with the values of the input and feed-back elements. Thus, before capacitor 54 begins to charge in response to the positive pulses applied via diode 50, the output of amplifier 60 is strongly negative and this output is applied to the base of PNP transistor 66 so that transistor 66 is in its conductive state. As the voltage across capacitor 54 builds, the negative output of amplifier decreases in amplitude until the output becomes positive and then again increases. As long as that output is below the voltage applied to the emitter of transistor 66 by voltage dividing resistors 68 and 70, transistor 66 remains conductive. However, when the base voltage exceeds the emitter voltage, transistor 66 becomes nonconductive and the voltage at the collector of transistor 66 shifts from the voltage at the emitter to ground.

Thus, potentiometer is adjusted so that when head 32 is moving past successive magnetic ink lines on an authentic document, the voltage at the positive input to amplifier 60, after head 32 passes the last magnetic line, is sufficient to cause transistor 66 to shift into its non-conductive state. The collector of transistor 66 is connected as one input to a conventional bistable multivibrator or flip flop 70 which responds to the grounding of the collector of transistor 66 by shifting its output, which is connected to the base of transistor 72, so that transistor 72 shifts from its non-conductive to its conductive state. In its conductive state, transistor 72 permits enough current to flow through bulb 40 to light it and indicate that the document is authentic.

After capacitor 54 discharges and the output of amplifier 60 returns to its initial negative value, transistor 66 is again conductive and the voltage at its collector is again substantially the voltage at its emitter. However, the output of multivibrator 70 remains the same until manually reset by operating switch 74 to ground the other input to multivibrator 70. Thus bulb 40 remains lit, indicating authenticity, until switch 74 is manually operated.

Reference is now made to FIG. 4 which illustrates a circuit similar to FIG. 3, producing an output indicating the authenticity of a document. As in FIG. 3, transistor 80 shifts its output condition upon a detection of an authentic document and this shift of condition causes a signal to be applied to driver circuits 82 and 84 via delay circuitry including flip flops 86 and 88. The output of driver circuit 84 is applied to transistor 86 to cause that transistor to shift its output condition and become conductive to permit current to flow through solonoid coil 90 which in turn operates a divertor or other device to cause the authentic documents to be separated from the counterfeit documents.

Figure 7:
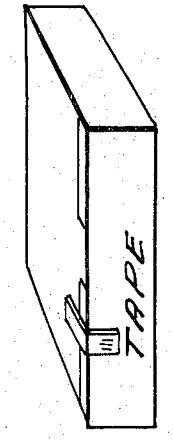
FIG. 7 shows the stamp of FIG. 5 attached to a box.
Figure 6:
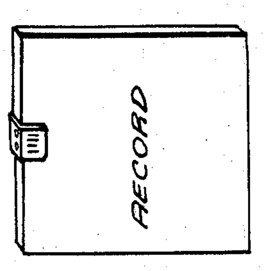
FIG. 6 shows the stamp of FIG. 5 attached to a record cover, sealing the opening.

As discussed above, the circuitry illustrated in FIGS. 3 and 4 has been found to be particularly advantageous in checking and authenticity of a security stamp which has been placed on a record album cover such as illustrated in FIG. 6 or on another container such as a box as shown in FIG. 7. The stamp is discussed further in the abovementioned Everly and Smith application. Stamp 100, as shown in FIG. 5 includes a plurality of bars of magnetic ink of roughly the same height. In the embodiment illustrated in FIGS. 5, there are four bars 102 but of course other numbers can be used.

Many changes and modifications of the above embodiment of the invention can be made without departing from the scope of the invention and, accordingly, that scope is intended to be limited only by the scope of the appended claims.

We claim:

1. Apparatus for authenticating a document having intaglio printing on a surface thereof and at least a single volume of magnetic ink intaglio printed on said surface of said document comprising:

a magnetic head for producing an electrical signal which varies as a function of the strength of the magnetic field adjacent said head, means for moving said head over said surface so that said head passes adjacent said volume of magnetic ink and produces an electrical signal, means electrically connected to said head for receiving and half-wave rectifying said signal, means for producing a substantially constant electrical reference signal including a potentiometer connected to a voltage source for varying said reference signal, means for comparing the rectified signal with said reference signal and producing a first signal when the rectified signal exceeds the reference signal by a predetermined amount and a second signal when the rectified signal does not exceed the reference signal by a predetermined amount including an operational amplifier having a positive and negative input so that the output of said operational amplifier is a function of the difference between the signals applied to said inputs, means connecting said potentiometer to one of said inputs, and means connecting said reference signal producing means to the other of said inputs so that said operational amplifier produces said first signal when said rectified signal exceeds the reference signal by a predetermined amount and said second signal when the rectified signal does not exceed the reference signal by a predetermined amount, means for receiving said first and second signals, producing a third signal when said first signal is produced, and maintaining said third signal after said first signal had ended, means for manually resetting said receiving, producing and maintaining means so as to end said third signal, and means connected to said receiving, producing and maintaining means for receiving said third signal and producing an indication that said document is authentic when said third signal is produced and until said third signal is ended.

2. Apparatus as in claim 1 wherein said receiving and producing means includes a light bulb connected to a source of voltage via a transistor and wherein said receiving, producing and maintaining means includes said transistor and means connected to said transistor for causing said transistor to become and remain non-conductive until said first signal is produced so that said bulb is not illuminated.

3. Apparatus as in claim 1 wherein said rectifying means includes an operational amplifier having a positive and negative input so that the output of said operational amplifier is a function of the difference between the signals applied to said inputs, means connecting said head to one of said inputs, means applying a substantially constant reference signal to the other of said inputs, diode means connected to the output of said amplifier so that said diode conducts current to produce said rectified signal when said signal produced by said head exceeds said reference signal applied to one of said operational amplifier inputs.

4. Apparatus as in claim 1 including means connected to said receiving and rectifying means and to said comparing and producing means for integrating said rectified signal so that a plurality of said electrical signals in succession causes said integrating means to produce a signal exceeding a given amplitude and so that said comparing and producing means produces said first signal only when said integrating means is producing a signal exceeding said given amplitude.

5. Apparatus as in claim 1 wherein said receiving and producing means includes a solonoid having a first condition when said authentic indication is produced and a second condition when said authentic indication is not produced.

6. A method of authenticating a document having intaglio printing on a surface thereof and at least a single volume of magnetic ink intaglio printed on said document comprising:

moving a magnetic head which produces an electrical signal which varies as a function of the strength of the magnetic field adjacent said head over said surface so that said head passes adjacent said volume of magnetic ink and produces an electrical signal for receiving and half-wave rectifying said signal, producing a substantially constant electrical reference signal comparing the rectified signal with said reference signal and producing a first signal when the rectified signal exceeds the reference signal by a predetermined amount and a second signal when the rectified signal does not exceed the reference signal by a predetermined amount, receiving said first and second signals, producing a third signal when said first signal is produced, and maintaining said third signal after said first signal has ended, manually resetting said receiving, producing and maintaining means so as to end said third signal and receiving said third signal and producing an indication that said document is authentic when said third signal is produced and until said third signal is ended.

* * * * *